(12) United States Patent
Tanner et al.

(10) Patent No.: US 8,443,575 B1
(45) Date of Patent: May 21, 2013

(54) COMPOSITE ACCESS DOOR

(75) Inventors: Richard B Tanner, Seattle, WA (US); Brian H. Korenaga, Shoreline, WA (US); Jeffrey F Stulc, Stanwood, WA (US); Ian C Burford, Duvall, WA (US)

(73) Assignee: The Boeing Company, Chicago, IL (US)

( * ) Notice: Subject to any disclaimer, the term of this patent is extended or adjusted under 35 U.S.C. 154(b) by 557 days.

(21) Appl. No.: 12/606,331

(22) Filed: Oct. 27, 2009

(51) Int. Cl.
  *E04C 2/54* (2006.01)
(52) U.S. Cl.
  USPC .............. 52/784.1; 244/129.3; 244/129.4; 244/129.5
(58) Field of Classification Search ............ 244/119, 244/129.4, 129.5, 129.3; 52/784.1, 784.13, 52/784.15, 717.01
See application file for complete search history.

(56) References Cited

U.S. PATENT DOCUMENTS

| | | | | | |
|---|---|---|---|---|---|
| 2,576,734 | A | * | 11/1951 | Voelker | 52/309.2 |
| 2,597,682 | A | * | 5/1952 | Snow | 220/327 |
| 2,742,247 | A | * | 4/1956 | Lachmann | 244/130 |
| 4,291,816 | A | * | 9/1981 | Lamoureux | 220/243 |
| 4,352,142 | A | * | 9/1982 | Olson | 361/218 |
| 4,530,443 | A | * | 7/1985 | Gorges | 220/327 |
| 4,579,248 | A | * | 4/1986 | Gorges | 220/327 |
| 5,316,167 | A | * | 5/1994 | Kay | 220/328 |
| 5,544,449 | A | * | 8/1996 | Amelio et al. | 49/383 |
| 6,557,338 | B2 | * | 5/2003 | Holme et al. | 60/226.2 |
| 7,576,966 | B2 | * | 8/2009 | Heeter | 361/215 |
| 8,141,820 | B2 | * | 3/2012 | Z niga Sagredo | 244/129.4 |
| 2007/0207421 | A1 | * | 9/2007 | Heeter | 431/22 |
| 2008/0154002 | A1 | * | 6/2008 | Nava et al. | 526/236 |
| 2008/0169381 | A1 | * | 7/2008 | Ostrem et al. | 244/129.3 |
| 2009/0166473 | A1 | * | 7/2009 | Zuniga Sagredo | 244/129.4 |
| 2009/0294591 | A1 | * | 12/2009 | Ramirez Blanco et al. | 244/129.4 |

OTHER PUBLICATIONS

"Design of Composite Wing Access Cover Under Impact Loads", *Applied Composite Materials*, pp. 219-229, Kluwer Academic Publishers, 2000.

* cited by examiner

*Primary Examiner* — Philip J Bonzell

(74) *Attorney, Agent, or Firm* — Yee & Associates, P.C.

(57) ABSTRACT

A door for an aircraft wing fuel tank access opening includes an outer impact resistant composite door panel, and an inner composite door panel. Double seals on the inner door panel prevent fuel leakage, and a chamfered outer edge on the outer door panel transfers a component of impact loads laterally into the wing skin to increase kinetic energy absorption.

23 Claims, 9 Drawing Sheets

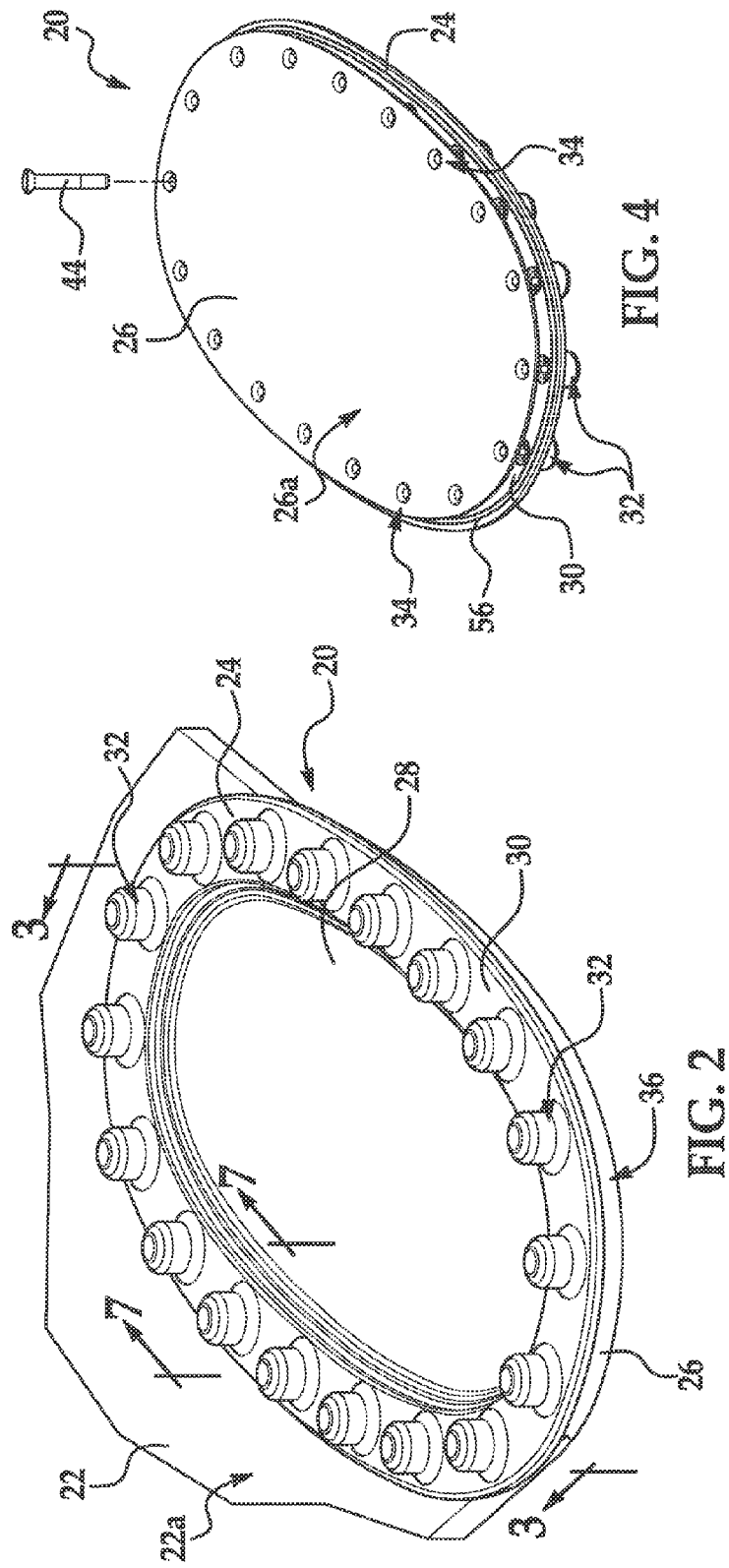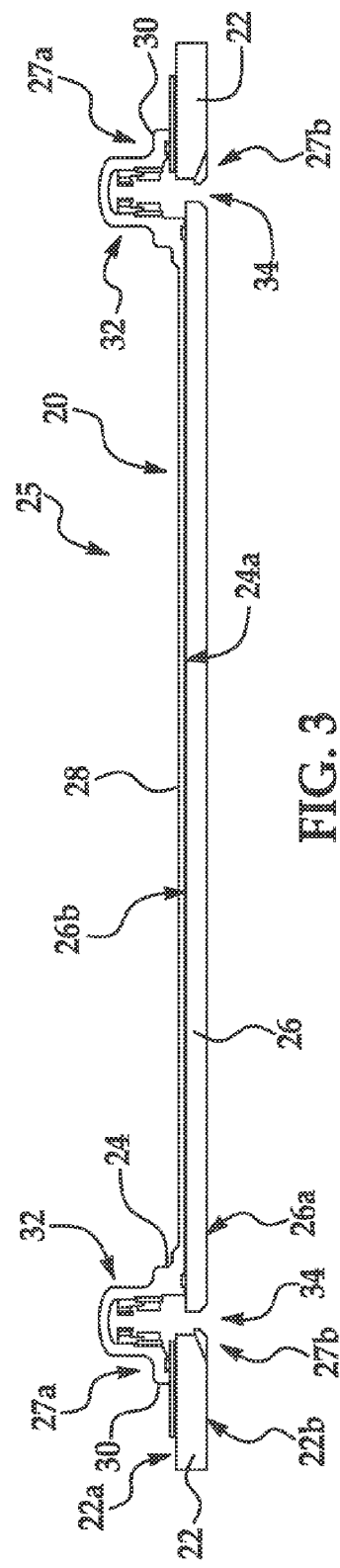

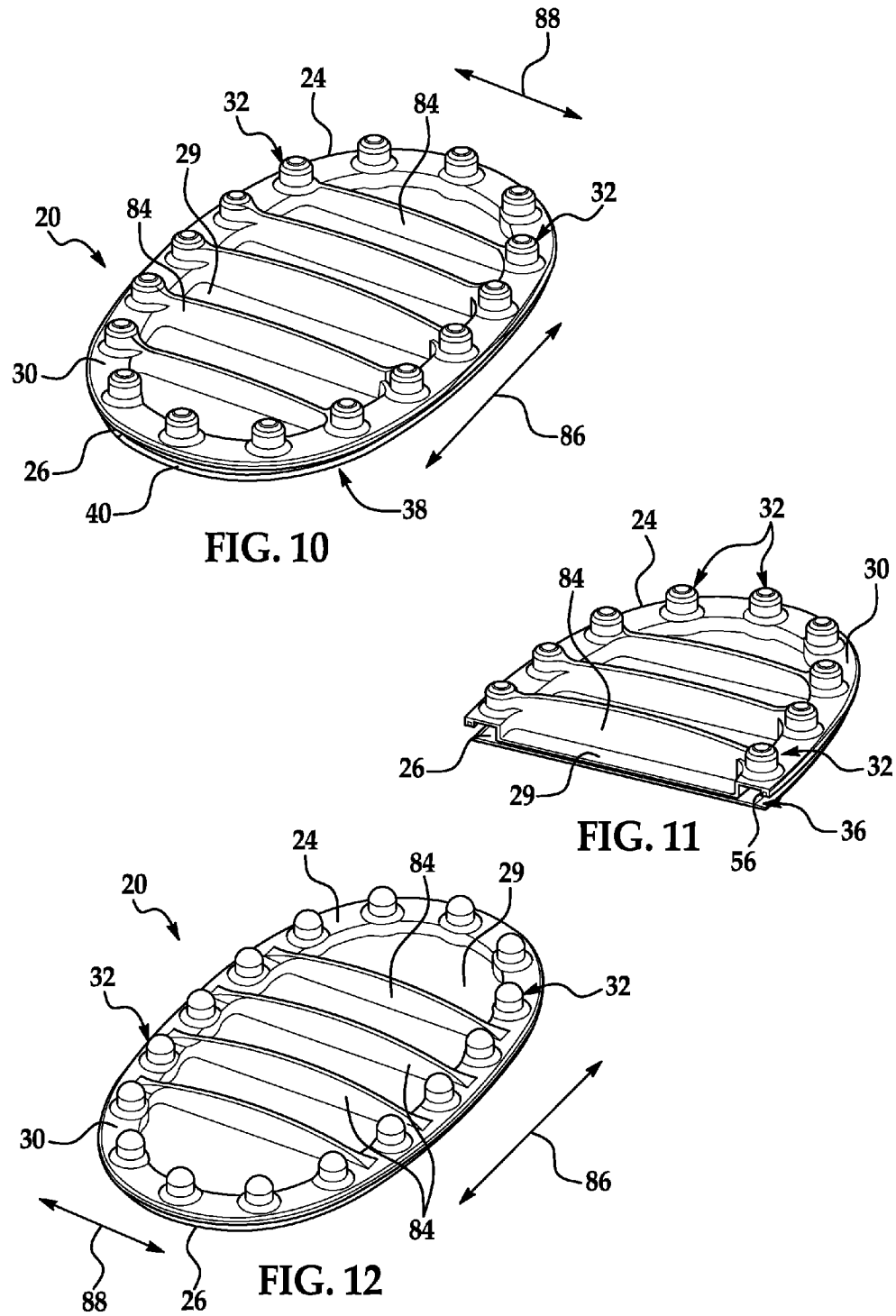

COMPOSITE ACCESS DOOR

TECHNICAL FIELD

This disclosure generally relates to closures such as doors, and deals more particularly with an impact resistant composite access door, especially for aircraft.

BACKGROUND

Access doors are sometimes provided in the aircraft skins to allow service personnel access to various internal systems. For example, access doors may be provided on the underside of aircraft wings in order to permit access to internal wing fuel tanks. Some of these access doors must be designed to withstand impact loads from debris while retaining a fluid tight seal to prevent the escape of fuel following an impact. In the case of aircraft wing skins formed of metal, these access doors may also be made of metal and may require high impact resistance.

The use of composite skins in some newer aircraft present challenges in designing suitable access doors, particularly for wing mounted fuel tanks. Metal access doors can add undesirable weight to the aircraft and may present material incompatibilities when used with certain composite skins, such as carbon fiber reinforced plastic (CFRP) laminates. Other design challenges include the need to meet requirements for electrostatic performance, lightning strike and impact resistance. In addition, the access doors must include fuel tight seals that prevent fuel leakage over the aircraft's expected service life.

Accordingly, there is a need for an access door for composite aircraft structures such as CFRP laminate wing skins which is lightweight, line replaceable and meets a variety of performance specifications required by aircraft regulating authorities.

SUMMARY

According to the disclosed embodiments, a lightweight, impact resistant composite access door is provided for use in composite wing skins for aircraft to allow access to fuel tanks and other internal volumes within a wing. The access door may meet regulatory requirements for electromagnetic performance and impact resistance. The access door is suitable for use with CFRP wing skins, and is simple in design, allowing quick and easy replacement by line mechanics. The door employs a double, fluid tight seal that may reduce the possibility of fuel leaks resulting from impacts by debris. The construction of the door may result in the need for fewer and/or smaller fasteners to clamp the door to the wing skin.

According to one disclosed embodiment, an access door is provided for an opening in an aircraft skin. The access door comprises composite inner and outer door panels. The door also includes a first fluid seal between the inner door panel and the skin, and a second fluid seal between the inner and outer door panels. The outer door panel includes a chamfered edge engaging a corresponding chamfered edge on the skin in order to transmit a portion of an impact load on the door laterally into the plane of the skin. The outer door panel may include an exterior surface spaced outwardly from the skin into an airstream passing over the skin so as to deflect the airstream away from the skin in the area of the door. The inner door panel may be nylon resin reinforced by approximately 30% by weight of carbon fibers.

According to another disclosed embodiment, an aircraft structure is provided having an outer skin with an access opening therein, and a fluid tight door covering the access opening. The skin includes a chamfered edge surrounding the access opening, and the door includes a corresponding chamfered outer edge complementally engaging the chamfered edge of the skin. Means are provided for releasably fastening the door on the skin. The door includes a leading edge covered in metallic foil and extending into the airstream passing over the skin.

According to a further disclosed embodiment, an impact resistant door is provided for accessing a fuel tank through an opening in a composite aircraft wing skin. The door includes an outer composite door panel and an inner composite door panel with a center membrane. The outer door panel functions to absorb impact from debris or the like and reacts the force applied to the door by pressurized fuel within the wing skin. The inner door panel has an outer periphery sealed against the inside surface of the wing skin. A seal is also provided between the outer door panel and the inner door panel around the outer periphery of the center membrane to prevent the escape of fuel through the door in the event of a leak in the inner door membrane.

According to another disclosed embodiment, an aircraft structure comprises a carbon fiber composite laminate outer skin having an access opening therein allowing access to the interior of the structure. The skin includes a chamfered edge surrounding the access opening that exposes ends of carbon fibers in the laminate skin. A carbon fiber composite laminate access door covers the access opening and includes a chamfered outer edge exposing ends of carbon fibers in the laminate door. The chamfered edges of the skin and the door panel complementally engage each other. The carbon fibers of the skin and the door are substantially in end-to-end contact forming an electrical ground connection between the door panel and the skin. Means are provided for releasably fastening the door panel on the skin.

In accordance with still another embodiment, a method is provided for installing a door in an access opening in the skin of an aircraft. The method includes positioning an inner door panel against an inside face of the skin, and positioning an outer door panel against an outside face of the skin. An inner seal is formed between the inner door panel and the outer door panel, and an outer seal is formed between the inner door panel and the inside face of the skin The disclosed embodiments satisfy the need for an improved access door for aircraft fuel tanks and the like which overcomes limitations of existing access doors, and is suitable for use with composite aircraft skins.

BRIEF DESCRIPTION OF THE ILLUSTRATIONS

FIG. 2 is an illustration of an interior isometric view of an access door mounted in an aircraft skin.

FIG. 3 is an illustration of a sectional view taken along the line 3-3 in FIG. 2.

FIG. 4 is an illustration of an exterior isometric view of the access door.

FIG. 10 is an illustration of an interior isometric view of an alternate form of the access door.

FIG. 11 is an illustration similar to FIG. 10 but showing the access door in section.

FIG. 12 is an illustration of an interior isometric view of another form of the access door.

DETAILED DESCRIPTION

Figure 1:
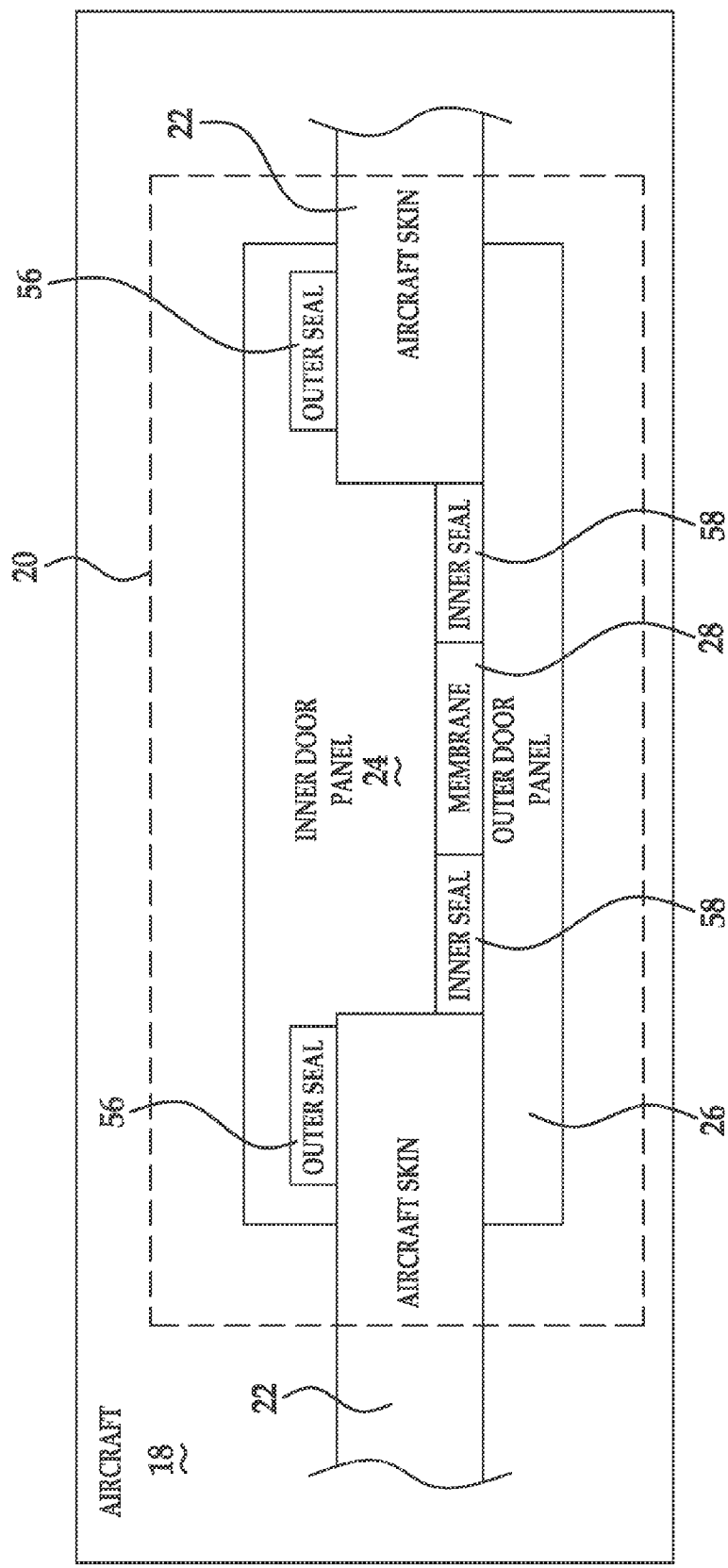
FIG. 1 is a functional block diagram of an access door mounted on a skin of an aircraft.
Figure 5:
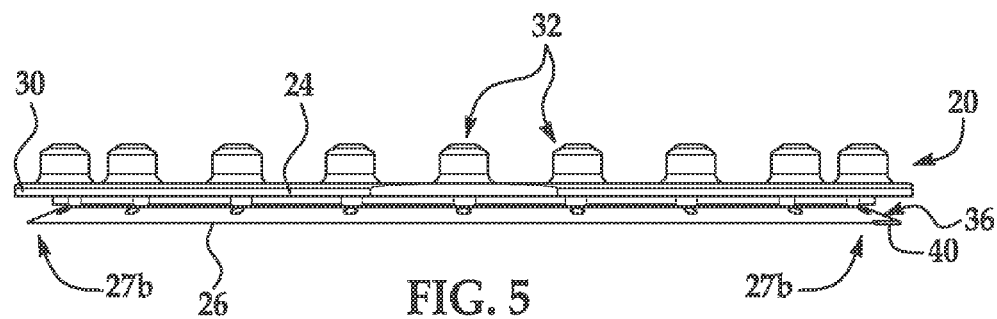
FIG. 5 is an illustration of a side view of the access door shown in FIGS. 2-4.

Referring first to FIG. 1, the disclosed embodiments generally relate to a composite access door 20 mounted on the skin 22 of an aircraft 18. The skin 22 may comprise, for example, and without limitation, a composite wing skin formed of a CFRP laminate. The access door 20 broadly comprises an inner door panel 24 having a membrane 28, and an outer door panel 26. The skin 22 of the aircraft 18 is clamped between the inner and outer door panels 24, 26, respectively. The inner door panel 24 is sealed to the outer door panel 26 by an inner seal 58, while the inner door panel 24 is sealed to the skin 22 by an outer seal 56.

Referring now to FIGS. 2-6, the access door 20 is mounted within an opening 25 (FIGS. 2 and 3) in an outer skin 22 of an aircraft 18 (FIG. 1). The skin 22 may form part of a wing (not shown) containing an internal fuel tank (not shown) which is accessed through the opening 25. The skin 22 may comprise, for example and without limitation, a composite material formed from laminated plies of CFRP. In the case of an internal wing fuel tank, the access opening 25 may be located on the underside of the wing where the access door 20 may be subject to impact from a variety of foreign objects and debris (FOD) sometimes encountered in normal operating environments, such as during takeoffs and landings. Various embodiments of the access door 20 may be employed at differing locations on the wings or at locations on the aircraft 18 other than on wings. The disclosed access door 20 is lightweight, due in part to the fact that the inner door panel 24 comprises a relatively thin membrane 28, yet may meet a variety of regulatory specifications as a result of its design features, including the impact resistance of the outer door panel 26.

The illustrated access door 20 is generally elliptical in shape, however other shapes may be possible, depending upon the application. The access door 20 broadly comprises an inner door panel 24, and an outer door panel 26. As will be discussed in more detail, and as shown in FIG. 2, the wing skin 22 is clamped between the outer peripheries 27a, 27b of the door panels 24, 26, respectively.

The inner door panel 24 comprises an elliptically shaped outer flange 30 at the periphery 27a of the inner panel 24 which overlies an inside face 22a of the skin 22. The flange 30 includes a plurality of integrally formed, spaced apart fastener bosses 32 which are axially aligned with fastener openings 34 in the outer door panel 26. The inner door panel 24 further includes a membrane 28 which covers the access opening 25 and may be integrally formed with the outer flange 30. The inner door panel 24 may be formed of suitable composite materials, but is relatively thin at the center membrane which is essentially non-structural, i.e. it is not intended to carry any significant structural loads. In one embodiment, the inner door panel 24 may be formed with a combination of nylon resin and carbon fibers wherein the content of the carbon fibers is approximately 30% by weight. The inner door panel 24 may be coated with a layer of antistatic material 31.

Figure 6:
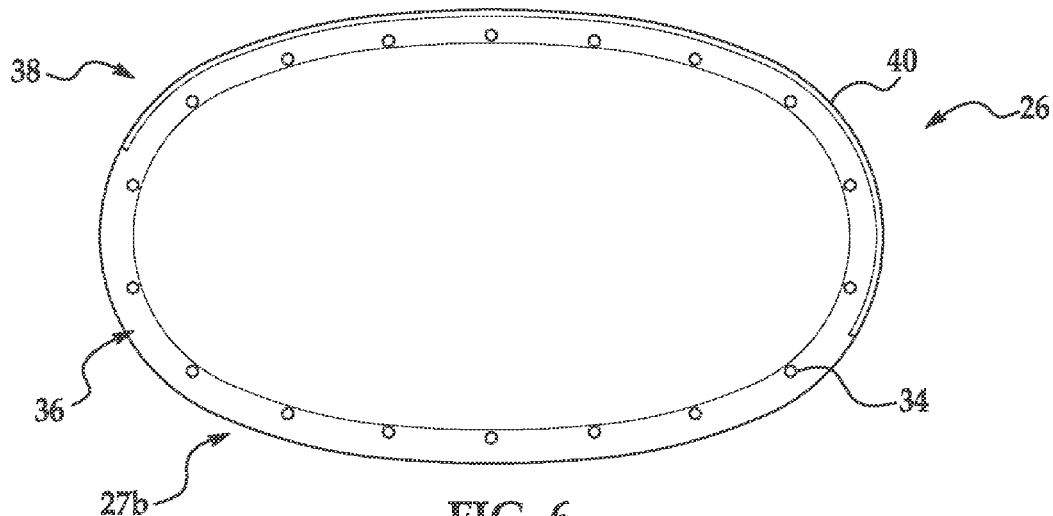
FIG. 6 is an illustration of a plan view of the interior side of the outer door panel forming part of the access door shown in FIGS. 2-4.

The outer door panel 26 is elliptically shaped and engages the inner door panel 24 in essentially face-to-face contact. The outer panel 26 may be formed of composite materials, such as, without limitation, laminated plies of CFRP in the form of tape and/or fabric. The outer door panel 26 includes a chamfer 36 (see FIGS. 5 and 6) around its entire outer periphery 27b. As best seen in FIG. 6, the outer panel 26 includes a leading edge 38 which is covered by a protective metallic foil 40, such as, without limitation, titanium. As shown in FIGS. 3 and 4, the outer face 26a of the outer door panel 26 is essentially flat, however other shapes are possible, depending upon the contour of the surrounding skin 22. As previously mentioned, the outer panel 26 includes a plurality of countersink fastener holes 34 around its periphery which are axially aligned with the fastener bosses 32 in the inner panel 24. As will be discussed below, suitable fasteners 44 (FIG. 4) pass through the outer panel 26 into the bosses 32 of the inner panel 24 in order to draw the inner and outer panels 24, 26 respectively against the inner and outer faces 22a, 22b of the skin 22, thereby clamping the door 20 on the skin 22. The fasteners 44 also serve to draw the outer face 24a of inner door panel 24 and the inner face 26b of outer door panel 26 (FIG. 3) into contact around the periphery of the door interface, thereby providing an electrostatic bond path into the skin 22.

Figure 7:
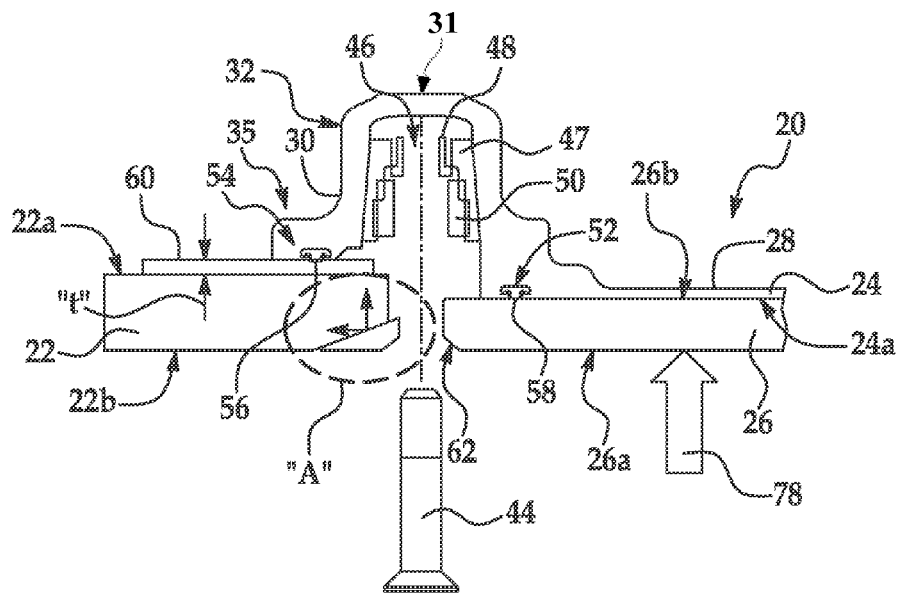
FIG. 7 is an illustration of a sectional view taken along the line 7-7 in FIG. 2.
Figure 8:
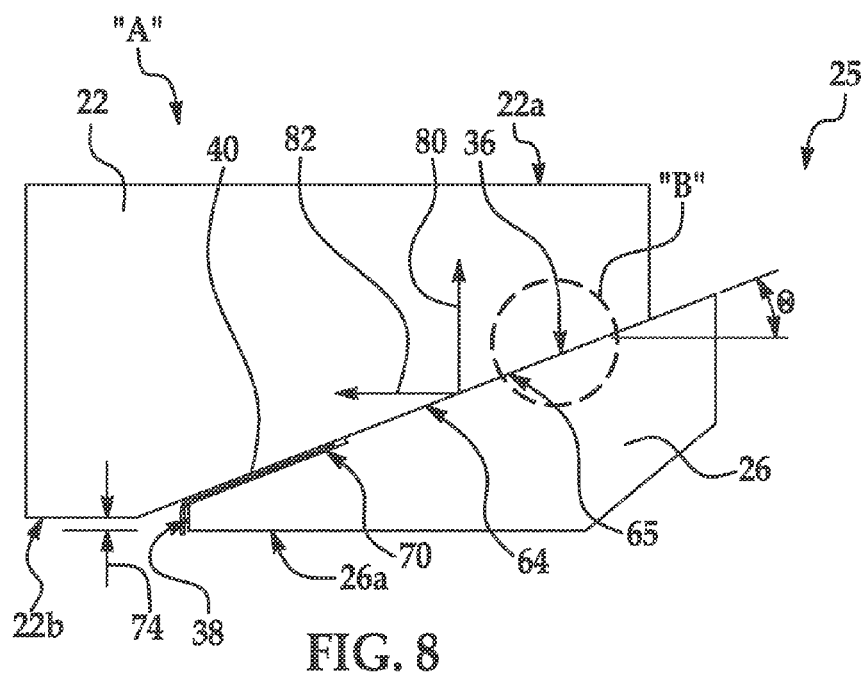
FIG. 8 is an illustration of the area designated as "A" in FIG. 7.

Attention is now directed to FIGS. 7 and 8 which illustrate additional edge details of the access door 20. As best seen in FIG. 7, the flange 30 of the inner panel 24 is provided with a pair of recesses 52, 54 extending around its entire periphery and which respectively contain a first, inner seal 58 and a second, outer seal 56. The inner seal 58 provides a fluid tight seal between the inner panel 24 and the outer panel 26 at the outer periphery of the membrane 28. The outer seal 56 provides a fluid tight seal between the outermost edge 35 of the inner panel 24 and the inner face 22a of the skin 22. In the illustrated example, seal 56 seals against a spacer 60 having a thickness "t" that is secured to the skin 22. The spacer 60 may be a carbon fiber/fiberglass laminate that is used to adjust for the difference in the thickness of the wing skin 22 to permit door commonality. In some applications, the spacer 60 may not be required, in which case the seal 56 directly engages the inside face 22a of the skin 22.

The inner panel membrane 28 may function as a cover or shield to prevent the undrained fuel or other materials from falling on service personnel when they remove the access door 20 during standard maintenance. Because of the relative thinness of the inner panel membrane 28, the membrane 28 may not be capable of resisting substantial loads such as those exerted by fuel inside the skin 22, and those resulting from impacts on the access door 20. Rather, the loads applied to the door 20 by fuel within the skin 22 and/or outside impacts are primarily carried by the outer door panel 26 whose thickness may be determined by ballistic resistance requirements of the particular application. The light weight inner door panel 24 may be designed so as to have less strength than the outer door panel 26, which may render it to be more subject to fracture compared to the outer door panel 26. In the event of a debris impact on the outer door panel 26, the outer door panel 26 may survive the impact with acceptable damage, but the displacement of the outer panel 26 caused by the impact may be sufficient to deflect the inner membrane 28 enough to cause it to fracture. In the event of such a fracture, fuel leakage may be prevented by the inner seal 58.

Installed within each of the fastener bosses 32 is fastener retention hardware 46 which may comprise an insert 47, a floating nut 48 and a nut retainer 50. The retention hardware 46 is adapted to retain one end of fastener 44 which releasably secures the door 20 on the skin 22. The insert 47 may be molded along with the inner panel 24, or may be installed in the bosses 32 after the panel 24 is fabricated. The retention hardware 46 may be a stainless steel or other metal that does not unfavorably react to carbon fiber used in the door panels 24, 26.

The outer face 22b of the skin 22 includes a chamfered edge 64 having a chamfer angle θ that matches (complements) that of the chamfer 36 on the outer door panel 26 so that the two chamfers 36, 64 complementally engage each other to form a chamfered interface 65 (FIG. 8) between the outer door panel 26 and the skin 22 when the access door 20 is installed in the opening 25. The chamfered interface 65 formed by the matching chamfers 36, 64 provide an improved load path that aids in dissipating kinetic energy generated by an impact load on the outer door panel 26. For example, as shown in FIG. 7, an impact force 78 acting on the outer face 26a of the outer panel 26 generates a load that is transmitted to the skin 22 through the chamfers 36, 64. The force 78 of the impact load is resolved into force components 80, 82 as shown in FIG. 8. One of the force components 80 is transmitted vertically, substantially normal to the plane of skin 22. The other force component 82 is transmitted laterally, substantially into the plane of the skin 22. The resolution of force 78 into components 80, 82 improves the impact resistance of the skin panel 22 by reducing interlaminar forces. The value of the chamfer angle θ may vary depending on the application. The improved load path resulting from the use of the matching chamfers 36, 64 may allow fewer and/or smaller fasteners 44 to be used to secure the door 20 on the skin 22. Additionally, the chamfers reduce the possibility that an impact 78 or similar force result in separation of the laminated plies (FIG. 8A) of the skin 22.

Figure 9:
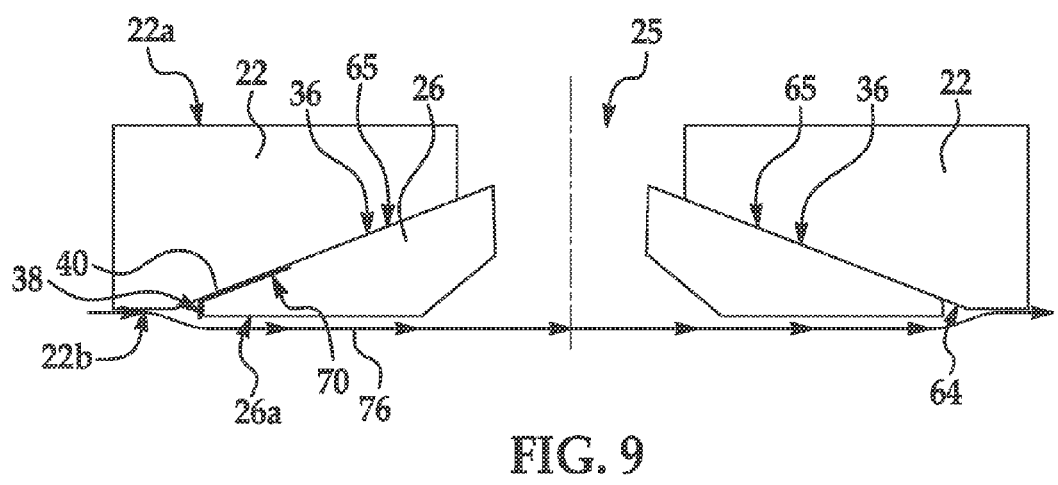
FIG. 9 is an illustration of a sectional view showing the deflection of an airstream flowing across the exterior surface of the access door and the skin.

As best seen in FIG. 8, the outer face 26a of the outer door panel 26 is spaced at a slight distance 74 from the outside face 22b of the skin 22. As a result of the spacing 74, the outer face 26a, including the leading edge is located in the airstream (FIG. 9) flowing over the skin 22, causing the airstream 76 to be deflected away from the skin 22 in the area of the door 20. The deflection of the airstream 76 away from the outer face 22b of the skin 22 may prevent the airflow 76 from directly engaging the chamfer 64 on the skin 22 which otherwise could have an undesired effect on any exposed laminate areas of the skin 22 at the chamfer 64.

Referring to FIG. 8, the leading edge 38 of the outer panel 26 may include a shallow recess 70 containing a layer of metallic foil 40, such as, without limitation, titanium foil. The layer of metallic foil 40 may be replaceable and may protect the leading edge 38 of the outer panel 26 against erosion which may be caused by wind and/or rain flowing over the skin 22. In lieu of the layer of metallic foil 40, it may be possible to apply a metallic or other protective coating over the leading edge 38. This protective coating may also be replaceable.

Figure 8A:
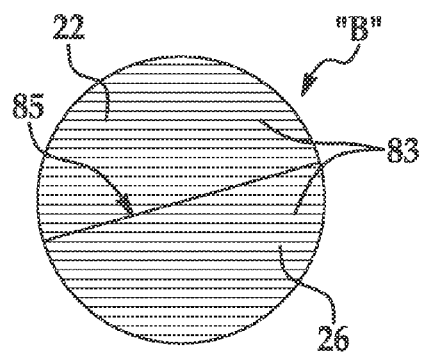
FIG. 8A is an illustration of the area designated as "B" in FIG. 8.

FIG. 8A illustrates a portion of the outer door panel-to-skin composite laminate interface 85 between the chamfers 36, 64 in FIG. 8. The ends of the carbon fibers 83 in the laminate door panel 26 and the laminate skin 22 are in substantially end-to-end contact at the interface 85. Because the carbon fibers 83 act as electrical conductors, the interface 85 forms a relatively good electrical connection between the door panel 26 and the skin 22, thereby electrically grounding the door 20 to the skin 22. The areal density of this electrical ground connection is increased by the chamfers 36, 64 which form a larger area of interface 85, compared to other possible interface geometries such as a simple butt joint or lap joint.

Attention is now directed to FIGS. 10 and 11 which illustrate an alternate form of the access door 20. In this embodiment, the inner door panel 24 includes a plurality of stiffener ribs 84 which are spaced apart in the span-wise direction 86 of the door 20 and only an outer seal 56. Depending on the shape of the door 20, the ribs may extend in a direction other than the span-wise direction 86. The stiffener ribs 84 extend between opposing sets of the fastener bosses 32 and may be formed integral with the web 29 and outer flange 30.

FIG. 12 illustrates another form of the access door wherein the stiffener ribs 84 extend in a chord-wise direction 88, are joined to the outer flange 30 and are spaced spanwise 86 between adjacent fastener bosses 32. The ribs 84 may extend in directions other than the chord-wise direction 88 to form any of various patterns, such as without limitation, a crossing pattern (not shown).

Figure 13:
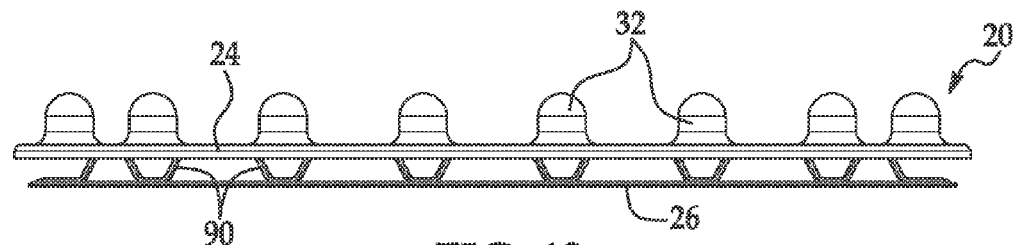
FIG. 13 is an illustration of a side view of another form of the access door.
Figure 14:
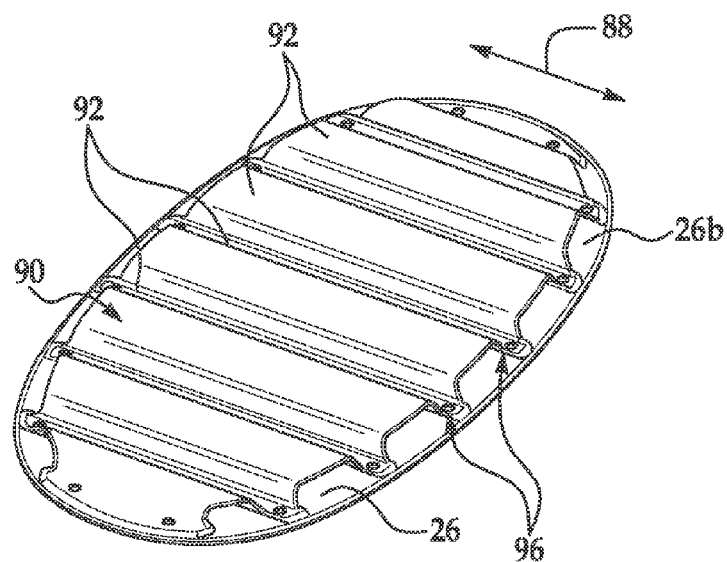
FIG. 14 is an illustration of an interior isometric view of the outer door panel shown in FIG. 13.
Figure 15:
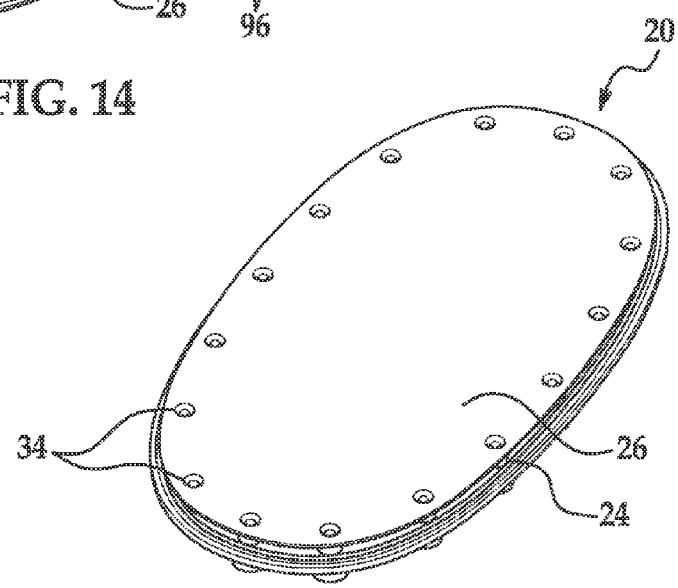
FIG. 15 is an illustration of an exterior isometric view of the access panel shown in FIG. 13.

Attention is now directed to FIGS. 13, 14 and 15 which illustrate an alternate form of the outer door panel 26 which includes a corrugated stiffener 90. The stiffener includes alternating, substantially U-shaped corrugations 92 extending in the chord-wise direction 88. The corrugations 92 may form cross sectional shapes other than a U-shape, and may extend in directions other than the chord-wise direction 88. The corrugated stiffener 90 may be formed of composite materials, and may be either co-cured with or co-bonded to the inside face inner of the outer panel 26. The stiffener 90 includes through holes 96 to allow the fasteners 44 (FIG. 7) to pass therethrough. In this example, the inner door panel 24 engages the corrugations 92 of the stiffener 90, rather than the inside face inner of the outer door panel 26.

Figure 16:
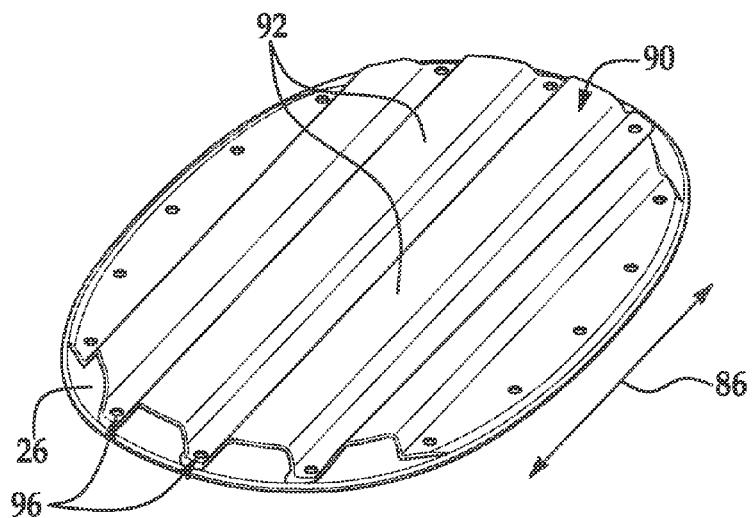
FIG. 16 is an illustration of an isometric view showing an alternate form of the stiffener attached to the outer door panel.

FIG. 16 illustrates an alternate form of the outer door panel 26 having a corrugated stiffener 90 attached thereto in which the corrugations 92 extend in the span-wise direction 86 of the panel 26. Although the corrugations 92 are shown as extending parallel to each other, other layout patterns, including a crossing pattern, are possible.

Figure 17:
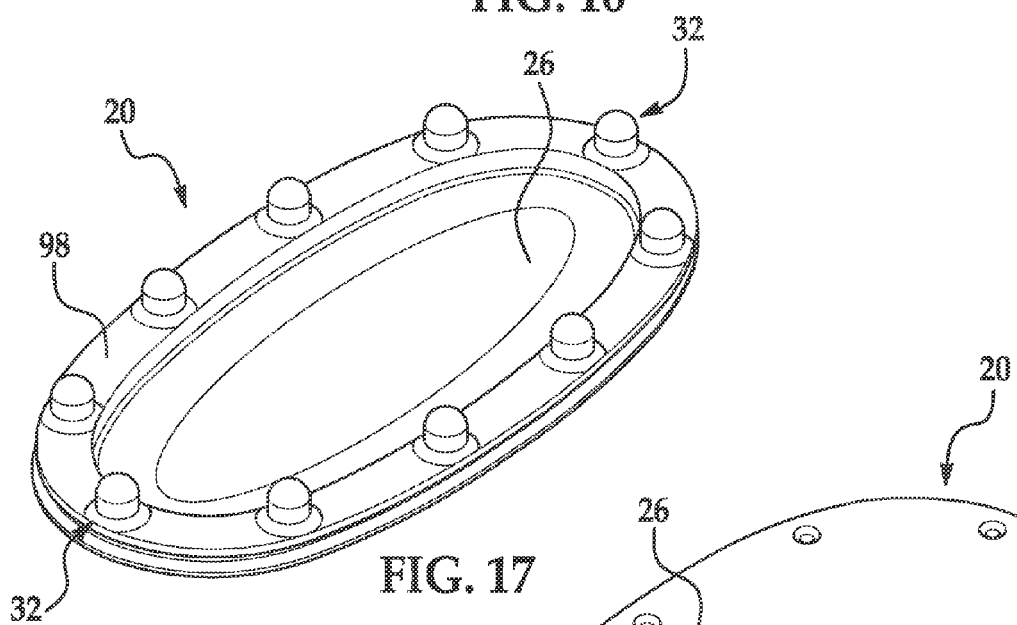
FIG. 17 is an illustration of an interior isometric view of another form of the access door.
Figure 18:
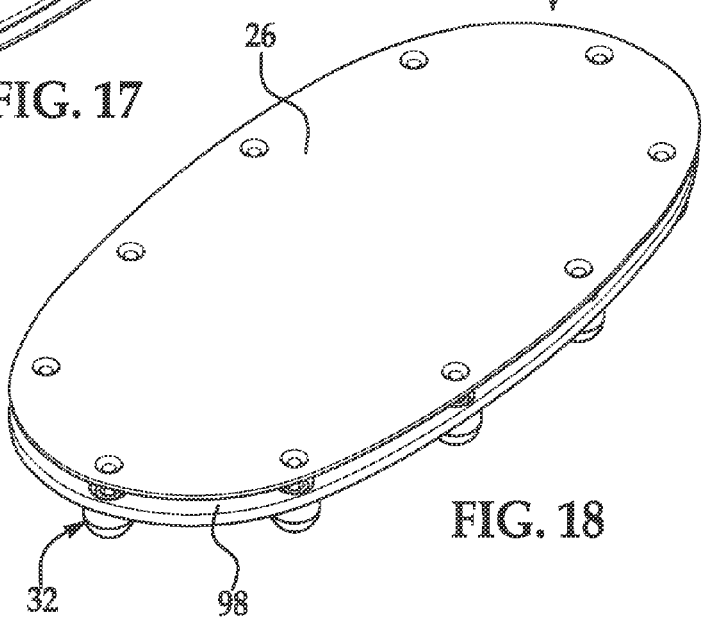
FIG. 18 is an illustration similar to FIG. 17 but showing the exterior side of the access door.
Figure 19:
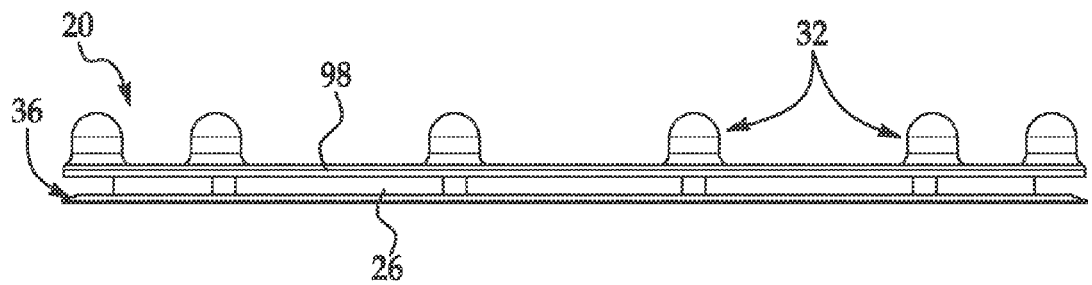
FIG. 19 is an illustration of a side view of the access door shown in FIGS. 17 and 18.

FIGS. 17, 18 and 19 illustrate a further embodiment of an access door 20 in which an elliptically shaped nut ring 98 having fastener bosses 32 is employed to releasably secure the outer door panel 26 on the skin 22 by means of fasteners (not shown). The nut ring 98 may be formed of composite materials and may be generally similar to the inner door panel 24 previously described, except that a membrane 28 or web 29 is not used and seals 56 and/or 58 may be omitted in non-fuel areas.

Figure 20:
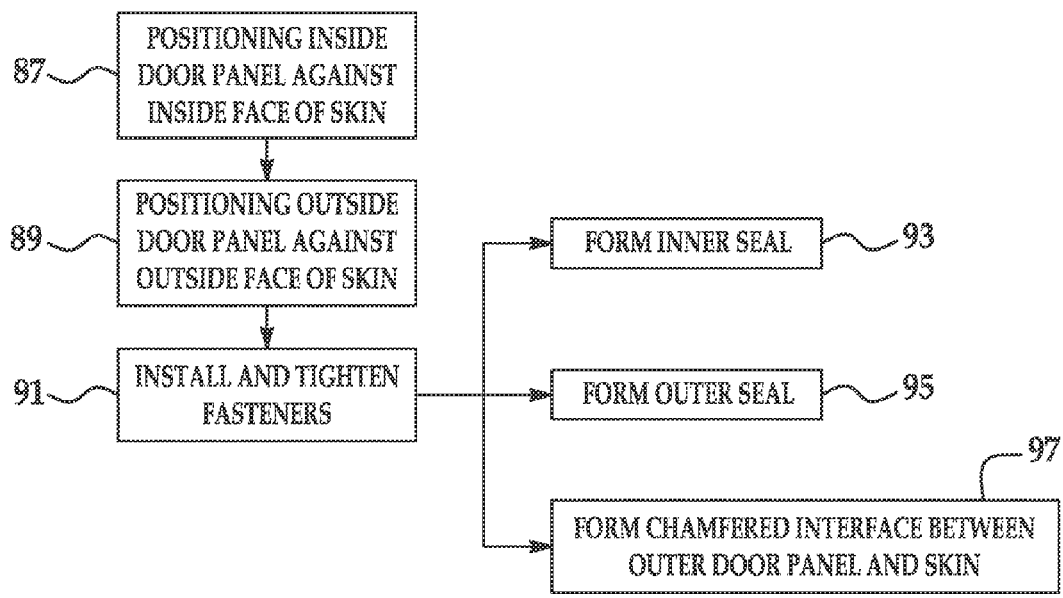
FIG. 20 is an illustration of a flow diagram of a method of installing a door in an access opening in an aircraft skin.

The various embodiments of the access door 20 described above may be installed in the access opening 25 (FIG. 3) by the method generally illustrated in FIG. 20. Beginning at step 87, the inner door panel 24 is positioned against the inside face 22a of the skin 22. Then at 89, the outer door panel 26 is positioned against the outside face 22b of the skin 22, such that the chamfers 36, 64 (FIG. 8) face each other to form interface 65 and the fastener openings 34 are axially aligned with the fastener bosses 32 in the inner door panel 24. The fasteners 44 (FIG. 7) are installed in the door 20 within countersinks 62 (FIG. 7) and tightened at step 91. Tightening the fasteners 44 draws the inner and outer door panels 24, 26 respectively, toward each other, thereby clamping the skin 22 between the panels 24, 26. As the fasteners 44 are tightened, the inner seal 58 is drawn against the inner face 26b of outer door panel 26 to form an inner seal at 93, and the outer seal 56 is drawn against the inner face 22a (or against the spacer 60) of the skin 22 to form the outer seal at 95. Tightening the fasteners at 91 also draws the chamfers 36, 64 against each other to form the chamfered interface 65, as shown at 97.

Figure 21:
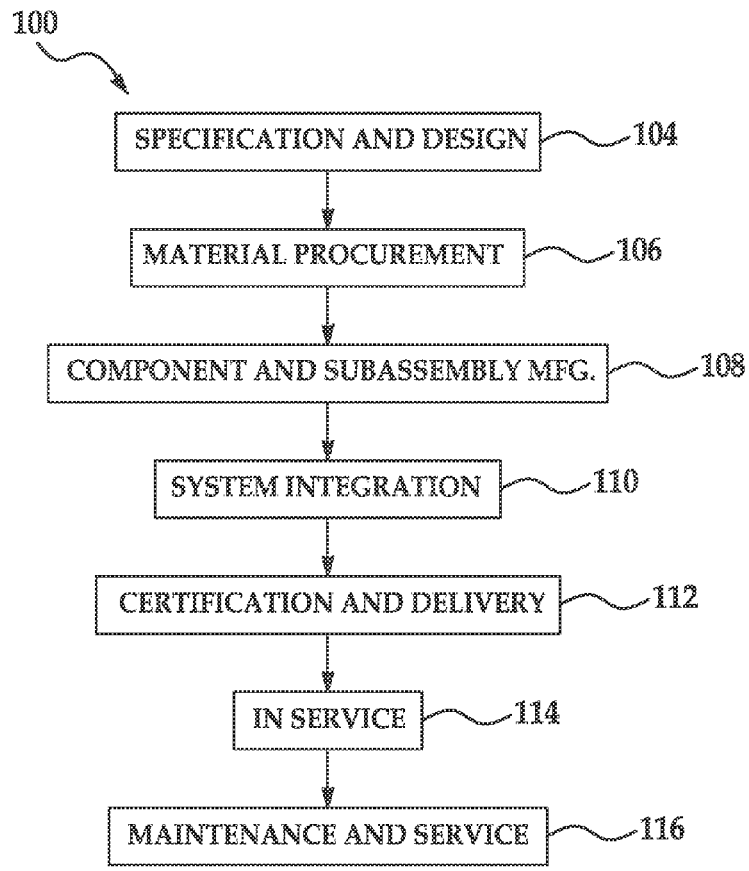
FIG. 21 is an illustration of a flow diagram of aircraft production and service methodology.
Figure 22:
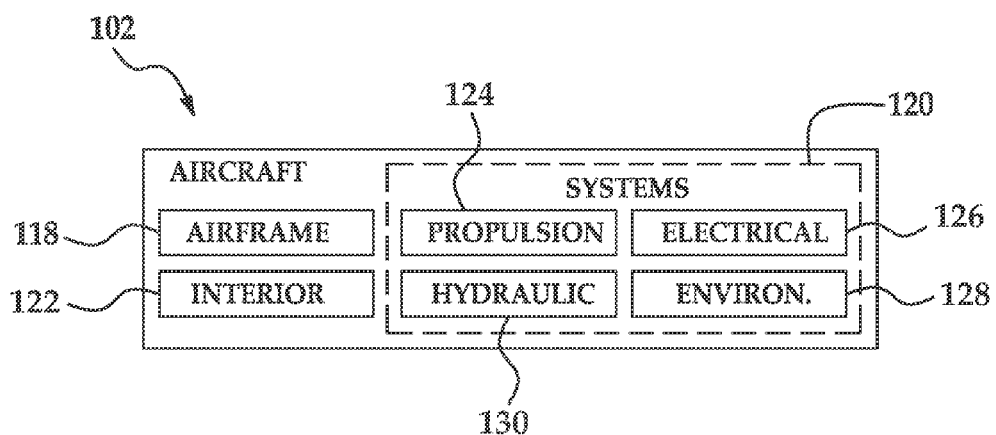
FIG. 22 is an illustration of a block diagram of an aircraft.

Embodiments of the disclosure may find use in a variety of potential applications, particularly in the transportation industry, including for example, aerospace, marine and automotive applications. Thus, referring now to FIGS. 21 and 22, embodiments of the disclosure may be used in the context of an aircraft manufacturing and service method 100 as shown in FIG. 21 and an aircraft 102 as shown in FIG. 22. During pre-production, exemplary method 100 may include specification and design 104 of the aircraft 102 and material procurement 106 in which the disclosed access door 20 may be specified for use in the aircraft 102. During production, component and subassembly manufacturing 108 and system integration 110 of the aircraft 102 takes place. The disclosed embodiments may be used to install an access door 20 which may form part of the components and subassemblies. Thereafter, the aircraft 102 may go through certification and delivery 112 in order to be placed in service 114. While in service by a customer, the aircraft 102 is scheduled for routine maintenance and service 116 (which may also include modification, reconfiguration, refurbishment, and so on). The disclosed access door 20 may be used to replace an existing access door during the maintenance and service 116.

Each of the processes of method 100 may be performed or carried out by a system integrator, a third party, and/or an operator (e.g., a customer). For the purposes of this description, a system integrator may include without limitation any number of aircraft manufacturers and major system subcontractors; a third party may include without limitation any number of vendors, subcontractors, and suppliers; and an operator may be an airline, leasing company, military entity, service organization, and so on.

As shown in FIG. 22, the aircraft 102 produced by exemplary method 100 may include an airframe 118 with a plurality of systems 120 and an interior 122. The disclosed access door 20 may be installed in a skin forming part of the airframe 118. Examples of high-level systems 120 include one or more of a propulsion system 124, an electrical system 126, a hydraulic system 130, and an environmental system 128. Any number of other systems may be included. Although an aerospace example is shown, the principles of the disclosure may be applied to other industries, such as the marine, heavy equipment, power generation, refinery, and automotive industries.

The disclosed embodiments may be installed on the aircraft 102 during any one or more of the stages of the production and service method 100. For example, the disclosed access door 20 may be installed on the aircraft 102 during the production process 110. Similarly, the disclosed access door may be installed on the aircraft 102 while the aircraft 102 is in service 114.

Although the embodiments of this disclosure have been described with respect to certain exemplary embodiments, it is to be understood that the specific embodiments are for purposes of illustration and not limitation, as other variations will occur to those of skill in the art.

What is claimed:

1. An access door for an opening in an aircraft skin, comprising:
   a composite inner door panel comprising fastener bosses;
   a composite outer door panel, the composite outer door panel comprising a chamfered edge to directly engage the aircraft skin, and further comprising fastener holes; and
   fasteners engaging the composite outer door panel at the fastener holes and attached to the composite inner door panel within the fastener bosses.

2. The access door of claim 1, wherein the composite outer door panel comprises an exterior surface spaced outwardly from the aircraft skin into an airstream passing over the aircraft skin, configured to deflect the airstream away from the aircraft skin in an area of the access door.

3. The access door of claim 1, wherein the composite inner door panel comprises a layer of antistatic material.

4. The access door of claim 1, wherein ends of carbon fibers in the composite outer door panel are configured substantially end-to-end with ends of carbon fibers in the aircraft skin.

5. The access door of claim 1, wherein carbon fibers in the composite outer door panel are configured to electrically ground the access door to the aircraft skin.

6. The access door of claim 1, wherein the chamfered edge of the composite outer door panel is configured to complementarily engage a chamfered edge of the aircraft skin.

7. The access door of claim 1, wherein the composite inner door panel comprises a center membrane and a periphery.

8. The access door of claim 1, further comprising:
   a first fluid seal between the inner composite door panel and the aircraft skin; and
   a second fluid seal between the inner composite door panel and the outer composite door panel.

9. The access door of claim 1, wherein the composite outer door panel is further configured to transmit a force component of an impact load on the access door essentially into a plane of the aircraft skin.

10. The access door of claim 1, wherein the composite inner door panel is configured to allow fracture of a portion of the composite inner door panel upon an impact to the composite outer door panel.

11. The access door of claim 1, wherein the composite outer door panel comprises a corrugated stiffener.

12. The access door of claim 1, wherein the composite inner door panel comprises a plurality of stiffening ribs.

13. The access door of claim 1, wherein the composite inner door panel comprises a ring.

14. The access door of claim 1, wherein the composite inner door panel comprises nylon resin and carbon fibers.

15. The access door of claim 14, wherein the composite inner door panel comprises approximately 30% by weight carbon fibers.

16. The access door of claim 1, wherein the composite outer door panel comprises a leading edge covered in metallic foil.

17. The access door of claim 16, wherein the leading edge extends into an airstream passing over the aircraft skin.

18. An access door for an opening in an aircraft skin, comprising:
   a composite inner door panel comprising fastener bosses;
   a composite outer door panel, the composite outer door panel comprising fastener holes, the composite outer door panel further comprising a first chamfered edge configured to complementarily engage a second chamfered edge of the aircraft skin, carbon fibers in the composite outer door panel configured to electrically ground the access door to the aircraft skin;

fasteners engaging the composite outer door panel at the fastener holes and attached to the composite inner door panel within the fastener bosses.

19. The access door of claim 18, wherein the composite outer door panel further comprises a leading edge and a layer of metallic foil configured to protect the leading edge from erosion.

20. An access door for an opening in an aircraft skin, comprising:
- a composite inner door panel comprising a center membrane, the composite inner door panel further comprising fastener bosses;
- a composite outer door panel, the composite outer door panel comprising fastener holes, the composite outer door panel further comprising a first chamfered edge configured to complementarily engage a second chamfered edge of the aircraft skin, carbon fibers in the composite outer door panel configured to electrically ground the access door to the aircraft skin;
- a first fluid seal between the inner composite door panel and the aircraft skin;
- a second fluid seal between the inner composite door panel and the outer composite door panel; and
- fasteners engaging the composite outer door panel at the fastener holes and attached to the composite inner door panel within the fastener bosses.

21. The access door of claim 20, wherein the composite outer door panel further comprises a leading edge and a layer of metallic foil configured to protect the leading edge from erosion.

22. An access door for an opening in an aircraft skin, comprising:
- a composite inner door panel comprising a plurality of stiffener ribs, the composite inner door panel further comprising fastener bosses;
- a composite outer door panel, the composite outer door panel comprising fastener holes, the composite outer door panel further comprising a first chamfered edge configured to complementarily engage a second chamfered edge of the aircraft skin, carbon fibers in the composite outer door panel configured to electrically ground the access door to the aircraft skin, the composite outer door panel further comprising at least one corrugated stiffener;
- a fluid seal between the inner composite door panel and the aircraft skin; and
- fasteners engaging the composite outer door panel at the fastener holes and attached to the composite inner door panel within the fastener bosses.

23. The access door of claim 22, wherein the composite outer door panel further comprises a leading edge and a layer of metallic foil configured to protect the leading edge from erosion.

* * * * *